US010011360B2

(12) United States Patent
Uriu et al.

(10) Patent No.: US 10,011,360 B2
(45) Date of Patent: Jul. 3, 2018

(54) LOCK MECHANISM FOR AIRCRAFT PASSENGER SEAT

(71) Applicant: JAMCO CORPORATION, Mitaka-shi, Tokyo (JP)

(72) Inventors: Tsukasa Uriu, Mitaka (JP); Nozomu Tagami, Mitaka (JP); Masaji Ozaki, Mitaka (JP)

(73) Assignee: JAMCO CORPORATION, Tokyo (JP)

( * ) Notice: Subject to any disclaimer, the term of this patent is extended or adjusted under 35 U.S.C. 154(b) by 0 days.

(21) Appl. No.: 15/531,815

(22) PCT Filed: Dec. 22, 2014

(86) PCT No.: PCT/JP2014/083834
§ 371 (c)(1),
(2) Date: May 31, 2017

(87) PCT Pub. No.: WO2016/103311
PCT Pub. Date: Jun. 30, 2016

(65) Prior Publication Data
US 2017/0313427 A1    Nov. 2, 2017

(51) Int. Cl.
*B64D 11/06* (2006.01)
*B60N 2/20* (2006.01)
*F16B 7/14* (2006.01)

(52) U.S. Cl.
CPC .......... *B64D 11/0641* (2014.12); *B60N 2/206* (2013.01); *B64D 11/0624* (2014.12); *F16B 7/1454* (2013.01)

(58) Field of Classification Search
CPC ....... B64D 11/0641; B60N 2/206; B60N 2/20
See application file for complete search history.

(56) References Cited

U.S. PATENT DOCUMENTS 2,608,366 A    8/1952  Jergenson et al.
3,719,379 A *  3/1973  Sigmund ............... B60N 2/20
                                            297/378.12
(Continued)

FOREIGN PATENT DOCUMENTS

JP    9-165942 A    6/1997
JP    9-300970 A    11/1997
(Continued)

OTHER PUBLICATIONS

International Search Report dated Mar. 31, 2015, issued in counterpart International Application No. PCT/JP2014/083834, w/English translation (5 pages).
(Continued)

*Primary Examiner* — Timothy J Brindley
(74) *Attorney, Agent, or Firm* — Westerman, Hattori, Daniels & Adrian, LLP (57) ABSTRACT

In order to improve ease of maintenance of an aircraft passenger seat, the aircraft passenger seat 100 is adapted to be changeable between an upright position and a bed mode position at which the backrest is folded forward. A mechanism for locking the seat at each of the positions is provided with lock pins 350 provided on both sides of the backrest, a handle unit 200 mounted to a rear face of the backrest, and two wires 300 for connecting the handle unit 200 and the lock pins 350. A structure for connecting the wires 300 to the handle unit 200 is improved to facilitate the maintenance of the wires and to make the handle unit lightweight.

4 Claims, 10 Drawing Sheets

(56) References Cited

U.S. PATENT DOCUMENTS

| | | | | |
|---|---|---|---|---|
| 5,007,680 | A * | 4/1991 | Miyauchi | B60N 2/20 297/378.12 |
| 5,673,972 | A * | 10/1997 | Dudash | B60N 2/20 297/216.1 |
| 7,490,900 | B2 * | 2/2009 | Szczudrawa | B60N 2/3013 297/284.9 |
| 7,575,281 | B2 * | 8/2009 | Jeong | B60N 2/2354 297/341 |
| 2006/0076817 | A1 * | 4/2006 | Link | B60N 2/206 297/378.14 |
| 2009/0302158 | A1 | 12/2009 | Darbyshire et al. | |
| 2011/0226900 | A1 * | 9/2011 | Bamford | B60N 2/4495 244/118.6 |
| 2012/0169101 | A1 * | 7/2012 | Suzuki | B60N 2/12 297/354.1 |
| 2012/0280548 | A1 * | 11/2012 | Nock | B60N 2/20 297/354.1 |
| 2012/0286556 | A1 * | 11/2012 | Couasnon | B60N 2/20 297/463.1 |
| 2013/0009435 | A1 | 1/2013 | Westerink et al. | |
| 2013/0200668 | A1 | 8/2013 | Michalak et al. | |
| 2013/0320736 | A1 | 12/2013 | Teufel et al. | |
| 2014/0191553 | A1 * | 7/2014 | Blendea | B60N 2/20 297/354.1 |
| 2017/0113578 | A1 * | 4/2017 | Shiraishi | B60N 2/3011 |
| 2017/0113802 | A1 * | 4/2017 | Ozaki | B64D 11/0641 |

FOREIGN PATENT DOCUMENTS

| | | |
|---|---|---|
| JP | 2009-520638 A | 5/2009 |
| JP | 2013-529575 A | 7/2013 |
| JP | 2014-504573 A | 2/2014 |

OTHER PUBLICATIONS

Written Opinion dated Mar. 31, 2015, issued in counterpart International Application No. PCT/JP2014/083834, w/English translation (6 pages).

Notification of Reasons for Refusal dated Apr. 5, 2016, issued in counterpart Japanese Patent Application No. 2015-527692, w/English translation (4 pages).

Decision to Grant a Patent dated Aug. 9, 2016, issued in counterpart Japanese Patent Application No. 2015-527692, w/English translation (6 pages).

\* cited by examiner

FIG. 9

LOCK MECHANISM FOR AIRCRAFT PASSENGER SEAT

TECHNICAL FIELD

The present invention relates to a lock mechanism for aircraft passenger seats having improved the ease of maintenance.

BACKGROUND ART

Aircraft passenger seats having a backrest capable of being folded forward to change the seat to a bed mode position have been proposed.

This type of aircraft passenger seat adopts a mechanism for locking the backrest at a normal upright position and at a bed mode position. The lock mechanism has a function to fix the backrest by inserting pins provided at both sides of a backrest frame into receive members disposed on a fix-side frame.

Lock pins are pushed into the receive members by springs, and in a state where a handle provided on a rear face of the backrest is operated, metal wires connected to the handle draw out the lock pins from the receive members against the springs, and the lock is released.

Figure 4:
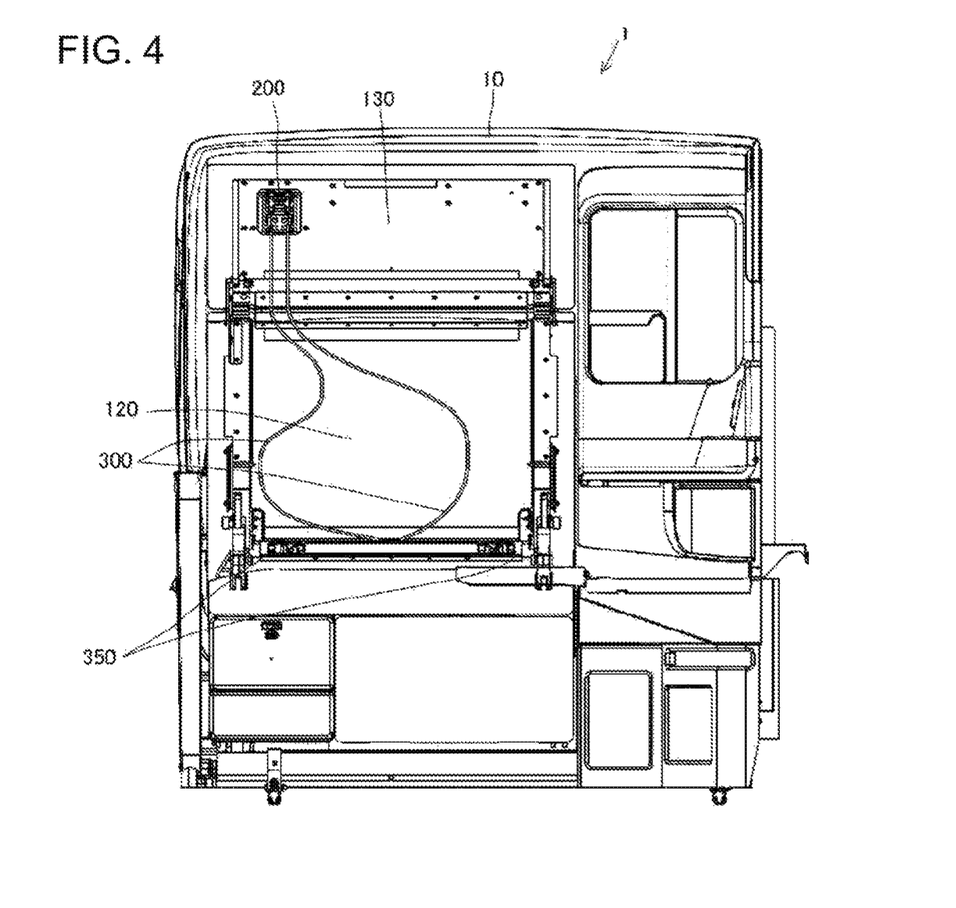
FIG. 4 is a front view of an aircraft passenger seat to which the present invention is applied.
Figure 5:
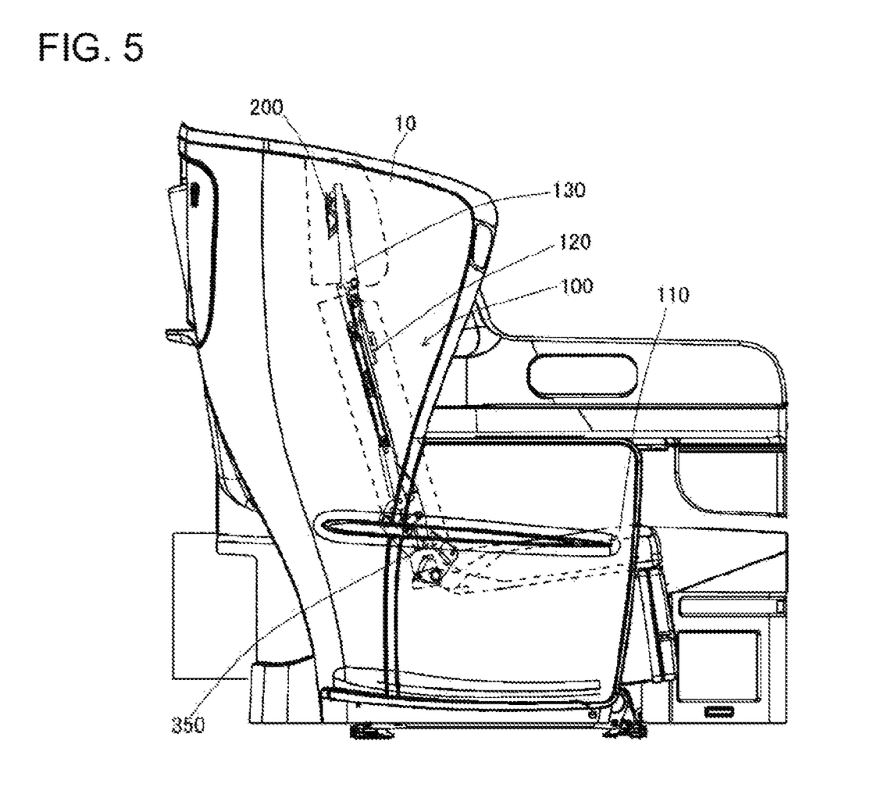
FIG. 5 is a side view of the aircraft passenger seat to which the present invention is applied.

FIGS. 4 and 5 are front and side views of the aircraft passenger seat to which the present invention is applied.

An aircraft passenger seat 1 includes a seat assembly 100 surrounded by a back shell 10. The seat assembly 100 includes a seat bottom 110, a backrest 120 and a headrest 130. The seat assembly 100 can be used at two positions, an upright position U where the backrest 120 and the headrest 130 are positioned upright, and a bed mode position B where the backrest 120 and the headrest 130 are folded forward.

A handle unit 200 is provided on the rear face of the headrest 130. The handle unit 200 is coupled to lock pins 350 via metal wires 300, and in a state where the handle within the handle unit 200 is operated, the lock pins 350 are drawn out from the receive members, allowing the backrest and the headrest to be tilted.

Figure 6:
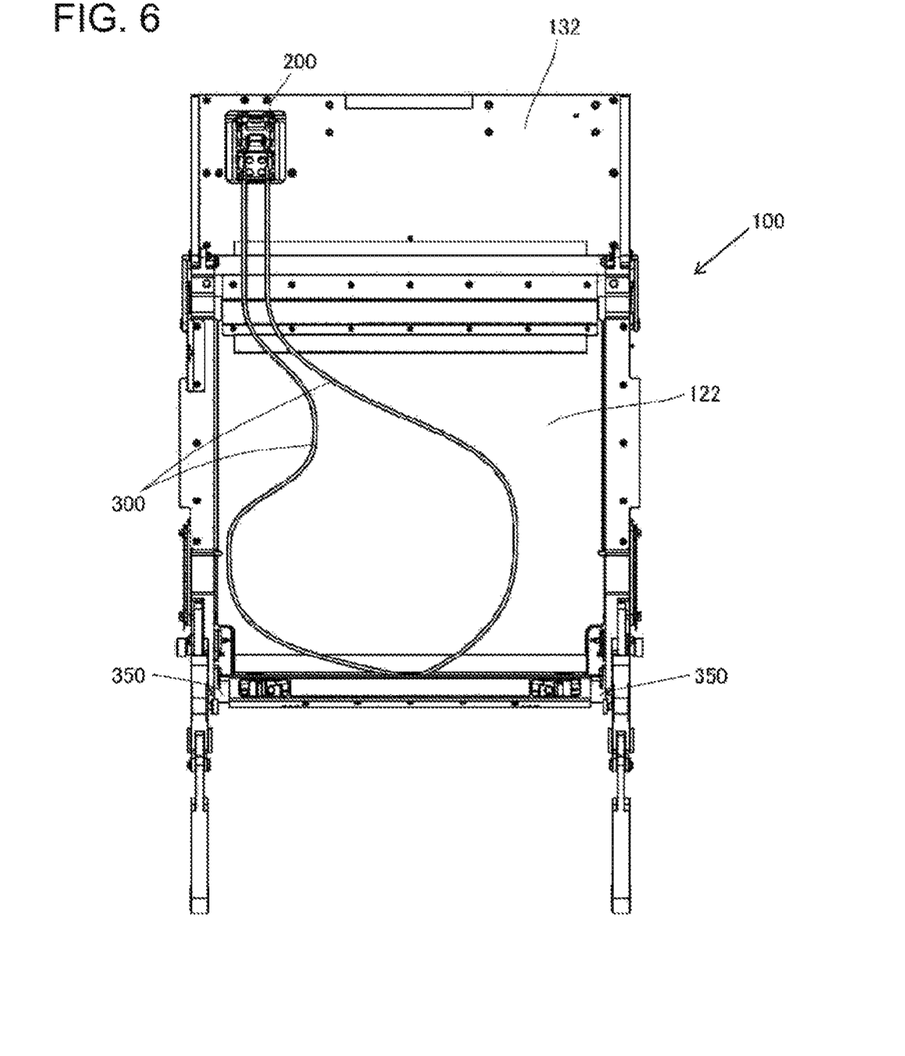
FIG. 6 is an explanatory view illustrating a general arrangement of a lock mechanism for an aircraft passenger seat to which the present invention is applied.

FIG. 6 is an explanatory view illustrating an outline of the lock mechanism.

The lock mechanism fixing the aircraft passenger seat assembly 100 to the upright position and the bed mode position includes the handle unit 200 provided on a rear face of a headrest frame 132, two wires 300 connected to the handle unit 200 and arranged along a backrest frame 122, and two lock pins 350 operated by the wires 300.

Figure 7:
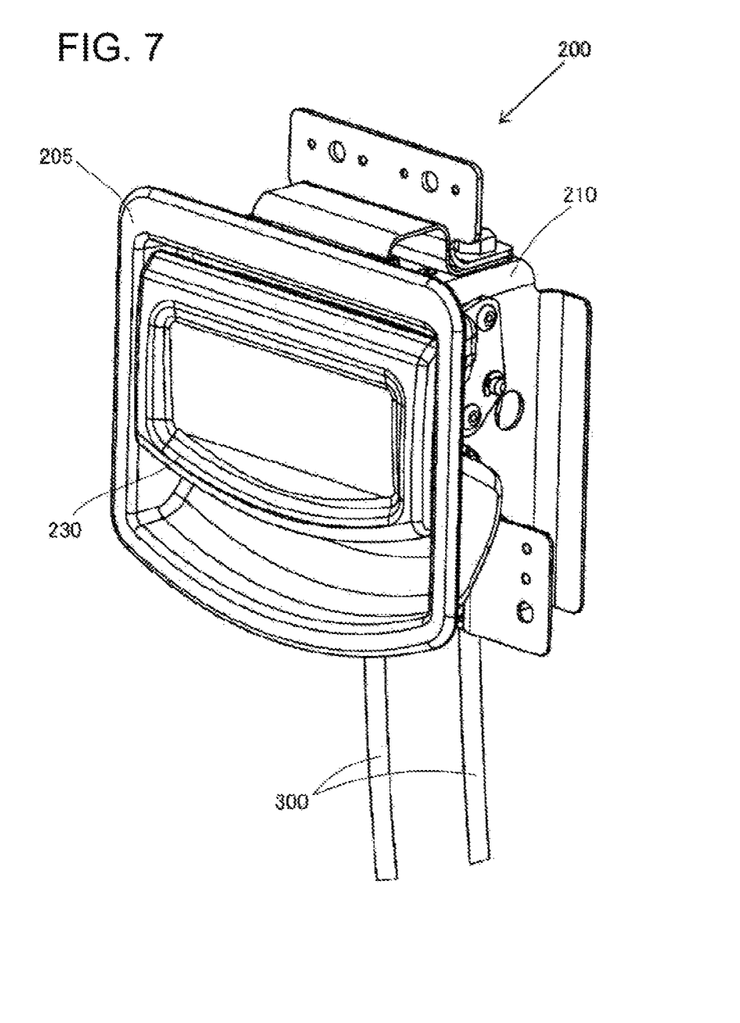
FIG. 7 is a perspective view of a prior art handle of an aircraft passenger seat to which the present invention is applied.

FIG. 7 is an external view of the handle unit 200. The handle unit 200 includes a handle 230 stored within a handle bracket 205.

Figure 8:
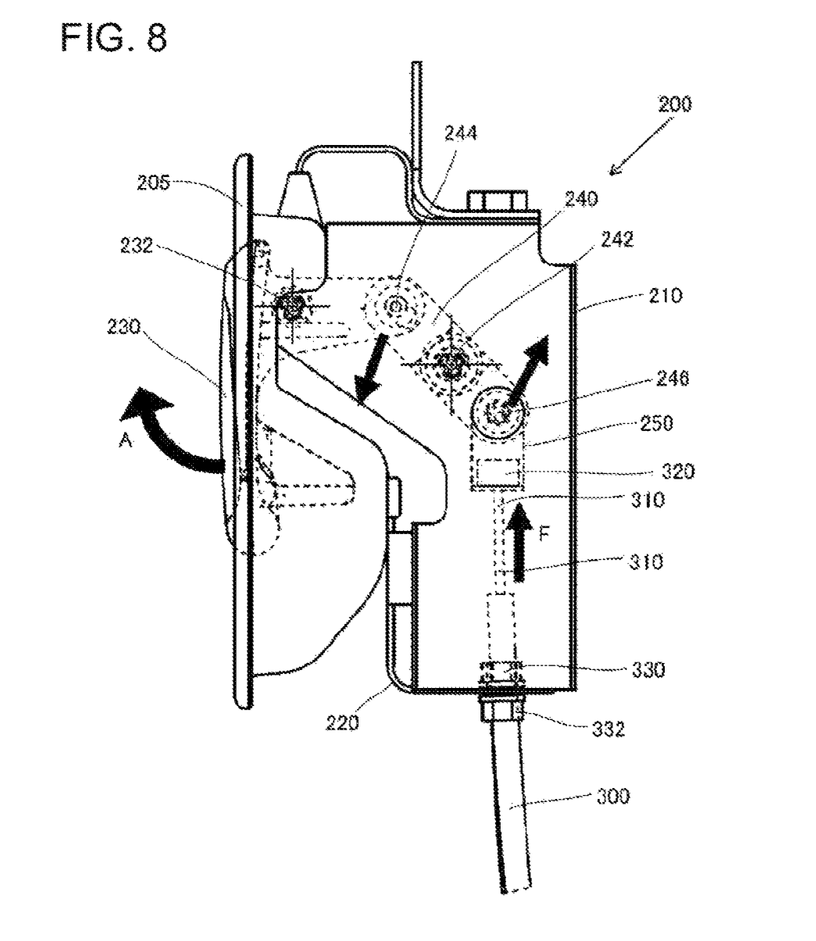
FIG. 8 is a mechanism view of the prior art handle of an aircraft passenger seat to which the present invention is applied.

FIG. 8 is an explanatory view illustrating a mechanism of a prior art handle unit 200.

The handle 230 is attached swingably about a fulcrum 232 within a fixing bracket 210 coupled to the handle bracket 205. The handle 230 is connected to one end portion of the link lever 240 via a pin 244. The link lever 240 can pivot about a fulcrum 242, and the other end portion of the link lever 240 is coupled to terminal members 250 of the wires via pins 246.

Each wire 300 adopts a structure where a metal wire 310 is slidably accommodated within an outer protective case, and the protective case is fixed to a housing 210 via a pair of nuts 330 and 332, with the metal wire 310 connected to the wire terminal member 250 via the stopper 320.

According to this arrangement, in a state where the handle 230 is pulled up in a direction of arrow A, the metal wires 310 are drawn upward in an arrow F direction, and the lock pins 350 are drawn out from the receive members.

Figure 9:
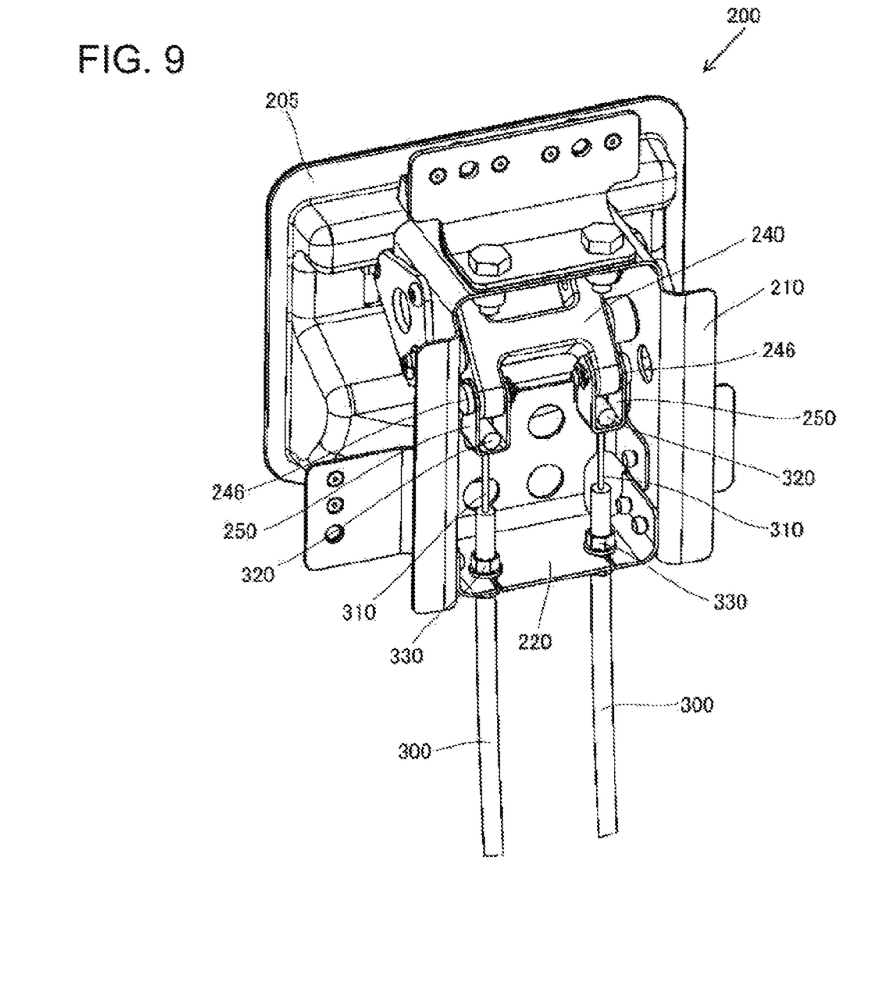
FIG. 9 is a rear perspective view of the prior art handle of an aircraft passenger seat to which the present invention is applied.

FIG. 9 is an explanatory view of a step for removing the wires 300 from the handle unit 200 for maintenance.

The wire terminal members 250 are connected to the link lever 240 via pins 246. The pins 246 are retained by snap rings 247.

The snap rings 247 are removed from the pins 246, and the pins 246 are drawn out.

The wire terminal members 250 are removed from the link lever 240, so the nuts 330 are loosened, and the metal wires 310 of the wires 300 that are passed through holes 222 formed on a housing 220 are drawn out toward a front side of a wire mounting bracket 220 through slits 224, and the whole body of the wires 300 are removed from the handle unit 200.

The arrangement of connecting the handle and the lock mechanism via metal wires is disclosed in the patent literatures listed below.

CITATION LIST

Patent Literature

[PTL 1] Japanese Unexamined Patent Application Publication No. 09-300970
[PTL 2] Japanese Unexamined Patent Application Publication No. 09-165942

SUMMARY OF INVENTION

Technical Problem

In this type of structure, repeated use causes the metal wires to stretch, and the amount of movement of the lock pins to reduce, such that malfunction of release operation of the lock is caused. Therefore, a maintenance is required to perform trimming of the metal wires to shorten the length of the wires, and to reconnect the wires.

According to the prior art handle unit described above, the slits 224 for inserting the metal wires 310 to the holes 222 of the wire mounting bracket 220 are designed to communicate the outer side of the wire mounting bracket 220 with the holes 222, so that they cause deterioration of rigidity of the whole wire mounting bracket 220.

The object of the present invention is to provide a lock mechanism for an aircraft passenger seat having a rigid and lightweight handle unit whose maintenance is facilitated, by improving the lock mechanism constituting the aircraft passenger seat.

Solution to Problem

In order to achieve the object described above, the present invention provides a lock mechanism for an aircraft passenger seat having an upright position in which a backrest is positioned upright, and a bed mode position in which the backrest is folded forward, wherein the lock mechanism includes lock pins provided on both sides of the backrest locking the backrest at positions corresponding to the upright position and the bed mode position, a handle unit provided on a rear face of the backrest, and two wires connecting the handle unit and the lock pins; and a bracket of the handle unit includes a center hole provided at a center of the bracket, a pair of wire mounting holes through which the wires provided on both sides of the center hole are mounted, and a pair of slits communicating the wire mounting holes with the center hole.

According to one aspect of the invention, the slit has a dimension allowing a metal wire provided within each of the wires to pass through the slit.

According to another aspect of the invention, the large-diameter hole has a dimension allowing a wire mounting bracket mounting an end portion of the metal wire to the handle side to pass through the hole, and the bracket of the handle unit is formed of a lightweight material such as aluminum alloy.

Advantageous Effects of Invention

According to the lock mechanism for an aircraft passenger seat of the present invention having the above-described configuration, maintenance can be facilitated, and the product can be made lightweight.

BRIEF DESCRIPTION OF DRAWINGS

FIG. 3A to FIG. 3C are three orthographic views of a relevant portion of FIG. 2.

DESCRIPTION OF EMBODIMENTS

Figure 1:
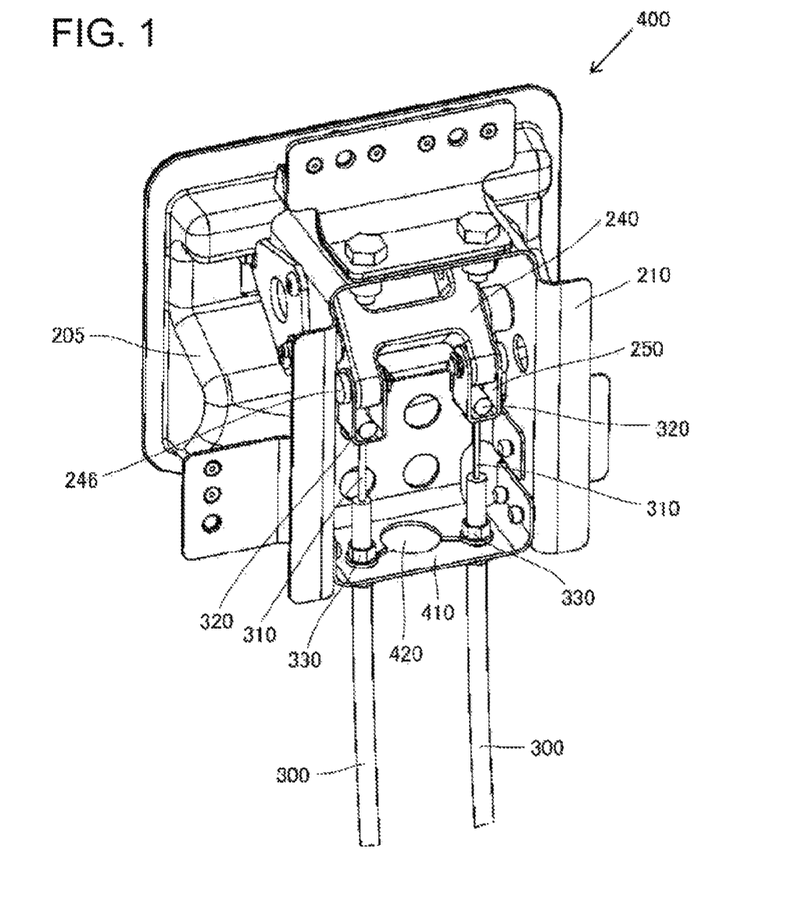
FIG. 1 is rear perspective view illustrating a configuration of a handle of an aircraft passenger seat according to the present invention.

FIG. 1 is a perspective view illustrating a handle unit from a rear side, illustrating an embodiment of the present invention.

Figure 10:
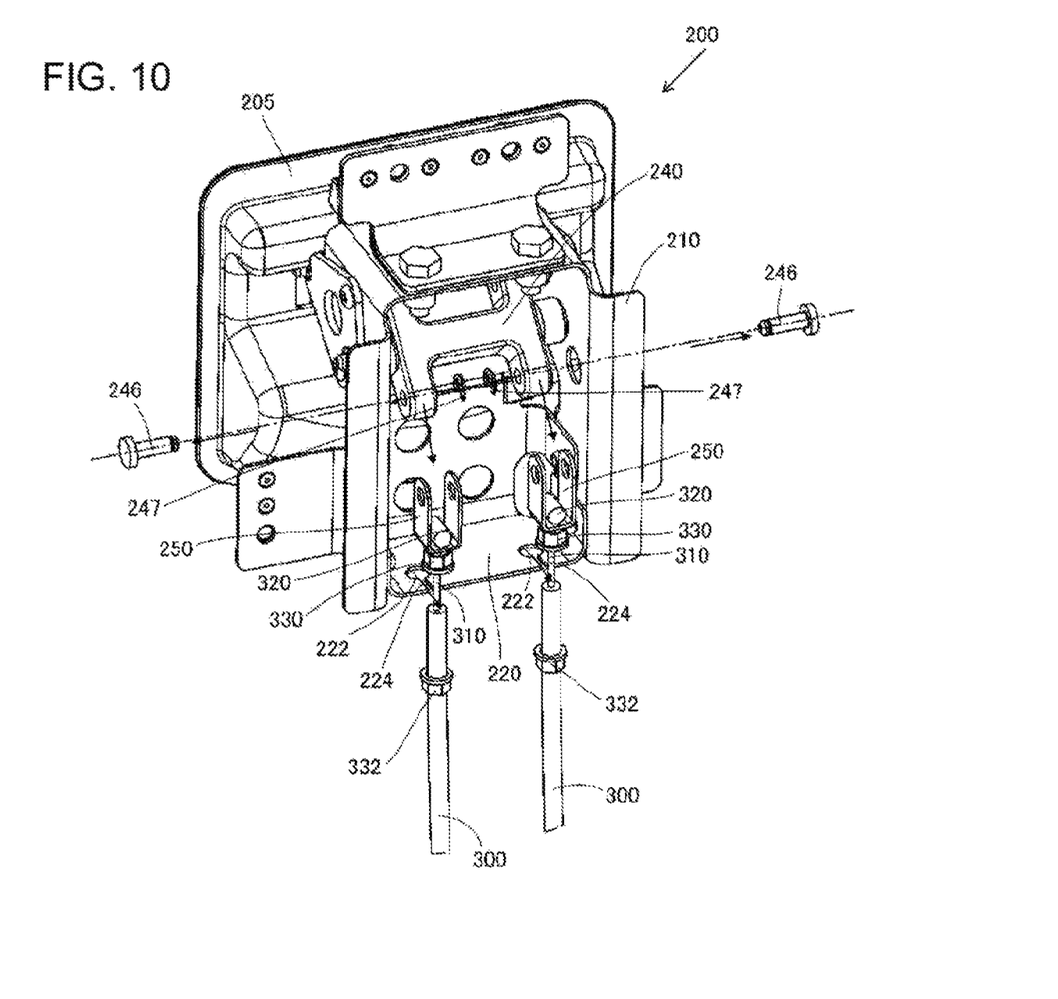
FIG. 10 is a rear perspective view of the prior art handle of an aircraft passenger seat to which the present invention is applied.

The configuration of components of a handle unit 400 other than a wire mounting bracket 410 to which wires 300 are mounted is similar to the prior art configuration described with reference to FIGS. 9 and 10, so that equivalent components are denoted with the same reference numbers, and descriptions thereof are omitted.

The wire mounting bracket 410 has a center hole 420 with a large diameter formed at a center portion thereof. The dimension of the center hole 420 is designed to allow wire mounting terminal members 250 supporting stoppers 320 of metal wires 310 to pass through the hole.

Figure 2:
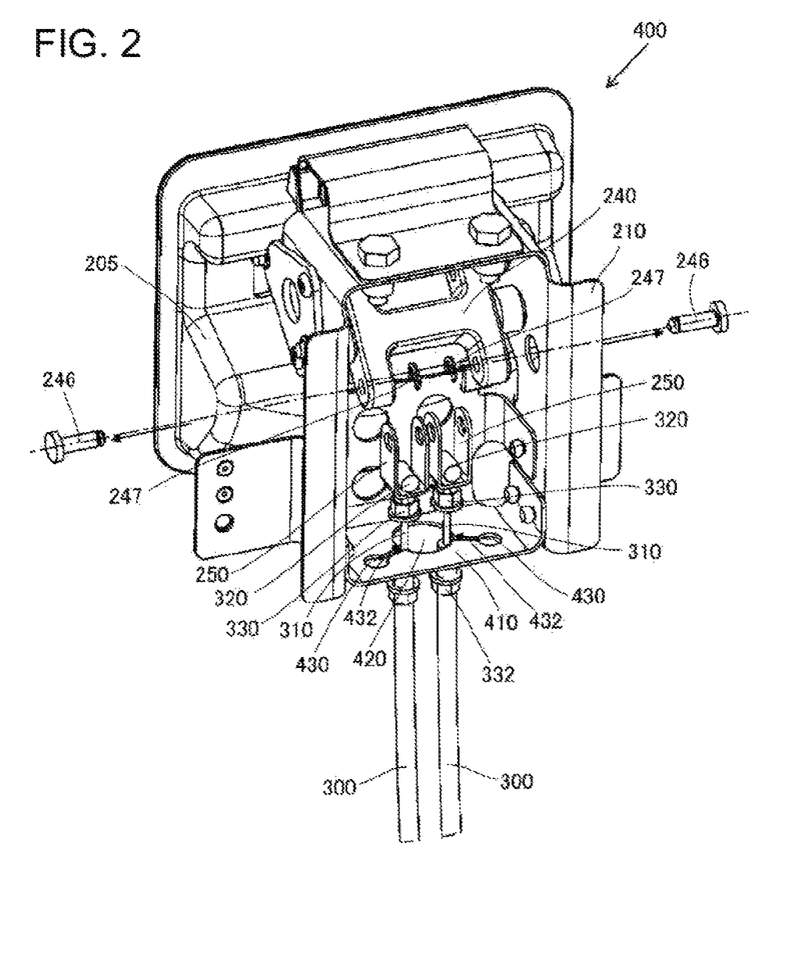
FIG. 2 is a rear perspective view illustrating a configuration of the handle of the aircraft passenger seat according to the present invention.

FIG. 2 illustrates a step for removing the wires 300 for maintenance. Retaining rings 247 are removed from pins 246, to pull out the pins 246, and connections between wire mounting terminal members 250 and a link lever 240 are disconnected. The nuts 330 are loosened and the wires 300 are freed from mounting holes 430 of the wire mounting bracket 410, the metal wires 310 are passed through slits 432 to gather the wires 300 to the center hole 420, and the wire mounting terminal members 250 are drawn out through the center hole 420.

Since this wire mounting bracket 410 is not provided with a slit communicated with the exterior, the bracket 410 can be formed with a high rigidity. Therefore, a lightweight material such as aluminum alloy can be used to reduce the weight of the whole bracket.

Figure 3A:
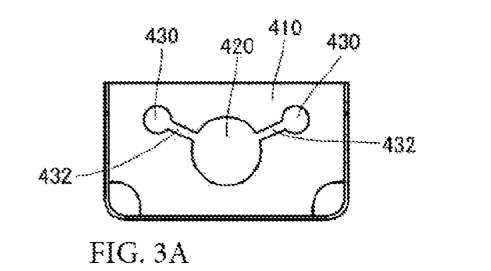
Figure 3B:
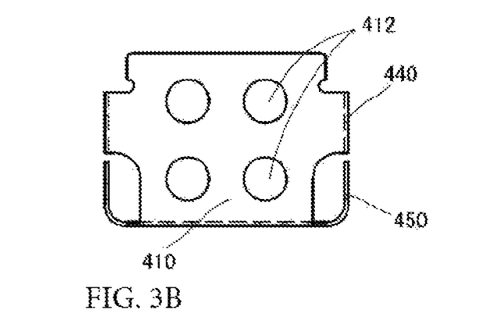
Figure 3C:
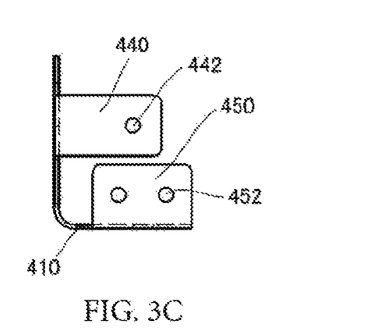

FIG. 3A to FIG. 3C are three orthographic views of the wire mounting bracket 410. A large-diameter center hole 420 is formed at a center of a bottom face plate of the wire mounting bracket 410.

A pair of wire mounting holes 430 are provided on both sides of the large-diameter center hole 420, and slits 432 are formed to communicate the holes 430 with the large-diameter center hole 420.

Lightening holes 412 are formed on a rear face plate of the wire mounting bracket 410 to realize lightweight. Further, flanges 440 and 450 for mounting are formed on both sides, and screw holes 442 and 452 are provided on the flanges.

The lock mechanism for aircraft passenger seat according to the present invention adopts the above configuration, so that maintenance operations such as replacement or trimming of wires mounted to the mechanism for locking the seat to the upright position and the bed mode position can be facilitated.

Further, the handle unit constituting the lock mechanism can be made lightweight, so that the reduction of weight of the whole aircraft passenger seat can be achieved.

REFERENCE SIGNS LIST

1 Aircraft passenger seat
10 Back shell
100 Seat assembly
110 Seat bottom
120 Backrest
130 Headrest
200 Handle unit
210 Mounting bracket
220 Wire mounting bracket
230 Handle
240 Link lever
250 Wire mounting terminal member
300 Wire
310 Metal wire
320 Stopper
330 Nut
410 Wire mounting bracket
420 Center hole
430 Wire mounting hole
432 Slit

The invention claimed is:

1. A lock mechanism for aircraft passenger seat comprising an upright position in which a backrest is positioned upright, and a bed mode position in which the backrest is folded forward,
    wherein the lock mechanism comprises lock pins provided on both sides of the backrest locking the backrest at positions corresponding to the upright position and the bed mode position, a handle unit provided on a rear face of the backrest, and two wires connecting the handle unit and the lock pins; and a bracket of the handle unit having a plate comprising a center hole provided at a center of the plate, a pair of wire mounting holes to which each of the wires are mounted, and a pair of slits communicating the wire mounting holes with the center hole.

2. The lock mechanism for aircraft passenger seat according to claim 1,
wherein the slit comprises a dimension allowing a metal wire provided within each wire to pass through the slit.

3. The lock mechanism for aircraft passenger seat according to claim 1,
wherein the center hole comprises a dimension allowing a wire mounting terminal member mounting an end portion of the metal wire to the handle side to pass through the center hole.

4. The lock mechanism for aircraft passenger seat according to claim 1,
wherein the bracket of the handle unit is formed of aluminum alloy.

\* \* \* \* \*